(12) United States Patent
Burns

(10) Patent No.: US 10,093,427 B2
(45) Date of Patent: Oct. 9, 2018

(54) ULTRALIGHT AIRCRAFT

(71) Applicant: AIRBUS DEFENCE AND SPACE GMBH, Ottobrunn (DE)

(72) Inventor: Simon Burns, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 108 days.

(21) Appl. No.: 15/041,424

(22) Filed: Feb. 11, 2016

(65) Prior Publication Data
US 2016/0236789 A1  Aug. 18, 2016

(30) Foreign Application Priority Data

Feb. 12, 2015 (EP) .................................. 15000418

(51) Int. Cl.
| | | |
|---|---|---|
| *B64C 1/00* | (2006.01) | |
| *B64D 27/02* | (2006.01) | |
| *B64C 39/02* | (2006.01) | |
| *B64C 31/00* | (2006.01) | |

(52) U.S. Cl.
CPC .............. *B64D 27/02* (2013.01); *B64C 31/00* (2013.01); *B64C 39/02* (2013.01); *B64C 39/024* (2013.01); *B64C 2201/00* (2013.01); *B64C 2201/021* (2013.01); *B64C 2201/042* (2013.01); *B64C 2201/165* (2013.01)

(58) Field of Classification Search
CPC .......... B64C 2201/00; B64C 2201/021; B64C 2201/042; B64C 2201/165; B64C 31/00; B64C 39/02; B64C 39/024; B64C 39/00; B64C 39/10; B64C 23/005; B64D 27/02; B64D 2700/6295; Y02T 50/12
See application file for complete search history.

(56) References Cited

U.S. PATENT DOCUMENTS

| | | | | |
|---|---|---|---|---|
| 1,633,889 A | * | 6/1927 | Figlietti | ................ B64C 23/005 244/6 |
| 2,023,334 A | * | 12/1935 | Marmonier | ......... B64C 29/0033 114/144 R |
| 3,023,981 A | * | 3/1962 | Reiniger | ............. B64C 29/0075 244/12.4 |
| 3,026,065 A | * | 3/1962 | Holland, Jr. | ........ B64C 29/0075 244/12.4 |

(Continued)

FOREIGN PATENT DOCUMENTS

| | | |
|---|---|---|
| DE | 601 24 224 T2 | 10/2007 |
| FR | 2 856 378 A1 | 12/2004 |

OTHER PUBLICATIONS

European Search Report for Application No. 15000418.2 dated Aug. 3, 2015.

*Primary Examiner* — Medhat Badawi
(74) *Attorney, Agent, or Firm* — Jenkins, Wilson, Taylor & Hunt, P.A.

(57) ABSTRACT

An aircraft which has a supporting structure which has at least one fuselage, a wing structure and at least one drive apparatus. The drive apparatus has at least one propeller and a drive motor. The aircraft has at least one energy store for providing energy for operation of the drive apparatus. The at least one drive apparatus and the at least one energy store are mechanically connected to the supporting structure and/or the wing structure of the aircraft by a securing device.

19 Claims, 3 Drawing Sheets

(56) References Cited

U.S. PATENT DOCUMENTS

| | | | | |
|---|---|---|---|---|
| 3,159,361 A | * | 12/1964 | Weiland | B60V 1/14 114/279 |
| 3,329,376 A | * | 7/1967 | Sullivan | B64C 23/005 244/12.4 |
| 4,403,755 A | * | 9/1983 | Gutsche | B64C 31/00 126/572 |
| 5,758,844 A | * | 6/1998 | Cummings | B64C 29/0033 244/12.4 |
| 6,360,988 B1 | * | 3/2002 | Monroe | B64B 1/42 244/31 |
| 6,575,403 B1 | * | 6/2003 | Monroe | B64B 1/42 244/31 |
| 6,634,593 B2 | | 10/2003 | Lepretre et al. | |
| 7,090,549 B2 | * | 8/2006 | Garcia | B63H 7/02 114/61.1 |
| 7,874,514 B2 | * | 1/2011 | Said | B64C 3/385 114/273 |
| 8,702,031 B2 | * | 4/2014 | Morris | B64C 39/04 244/12.4 |
| 8,857,755 B2 | * | 10/2014 | Karim | B64C 29/0033 244/12.4 |
| 8,967,529 B1 | * | 3/2015 | Bennett | B64D 27/24 244/53 R |
| 9,555,886 B1 | * | 1/2017 | Hawass | B64D 1/16 |
| 2002/0040948 A1 | * | 4/2002 | Ragner | A63H 27/002 244/153 R |
| 2003/0025032 A1 | * | 2/2003 | Lepretre | B64C 27/20 244/7 B |
| 2003/0066932 A1 | * | 4/2003 | Carroll | B64C 39/024 244/120 |
| 2003/0168552 A1 | * | 9/2003 | Brown | B64C 11/46 244/55 |
| 2005/0218692 A1 | * | 10/2005 | McNamee | B60J 11/00 296/136.07 |
| 2007/0130843 A1 | * | 6/2007 | Lenahan | A45B 11/00 52/79.1 |
| 2007/0246601 A1 | * | 10/2007 | Layton | B64C 29/0025 244/12.2 |
| 2009/0292407 A1 | * | 11/2009 | Minelli | B64C 27/26 701/3 |
| 2011/0042508 A1 | * | 2/2011 | Bevirt | B64C 15/00 244/12.4 |
| 2011/0253842 A1 | * | 10/2011 | Silkey | B64C 23/005 244/205 |
| 2013/0048792 A1 | * | 2/2013 | Szarek | B64C 39/024 244/175 |
| 2013/0062457 A1 | * | 3/2013 | Deakin | B64B 1/08 244/25 |
| 2014/0014766 A1 | * | 1/2014 | Redmon | B64C 39/02 244/13 |
| 2014/0195150 A1 | * | 7/2014 | Rios | B64C 39/024 701/469 |
| 2016/0144969 A1 | * | 5/2016 | Rawdon | B64C 3/185 244/13 |
| 2016/0194069 A1 | * | 7/2016 | Taylor | B64C 39/024 244/17.23 |
| 2016/0236789 A1 | * | 8/2016 | Burns | B64C 39/024 |
| 2016/0254576 A1 | * | 9/2016 | Burns | B64G 1/425 429/61 |
| 2016/0260207 A1 | * | 9/2016 | Fryshman | G06T 7/0008 |
| 2016/0272316 A1 | * | 9/2016 | Nelson | B64C 39/024 |
| 2016/0307448 A1 | * | 10/2016 | Salnikov | A01B 79/02 |
| 2016/0311529 A1 | * | 10/2016 | Brotherton-Ratcliffe | B64C 27/20 |
| 2016/0340006 A1 | * | 11/2016 | Tang | B63C 9/01 |
| 2016/0355257 A1 | * | 12/2016 | Chappell | B64C 39/024 |
| 2016/0378108 A1 | * | 12/2016 | Paczan | B64C 37/02 705/330 |
| 2017/0144749 A1 | * | 5/2017 | Tao | B64C 13/28 |
| 2017/0144751 A1 | * | 5/2017 | Yu | B64C 27/001 |
| 2017/0144753 A1 | * | 5/2017 | Yu | B64C 39/024 |
| 2017/0144757 A1 | * | 5/2017 | Hall | B64C 39/024 |
| 2017/0152060 A1 | * | 6/2017 | Morisawa | B64D 47/08 |
| 2017/0202185 A1 | * | 7/2017 | Trumbull | A01K 29/005 |
| 2017/0203839 A1 | * | 7/2017 | Giannini | B64C 29/0033 |

* cited by examiner

ULTRALIGHT AIRCRAFT

CROSS-REFERENCE TO RELATED APPLICATION

This application claims priority to European Patent Application EP 15 000 418.2, filed Feb. 12, 2015, the entire disclosure of which is incorporated by reference herein.

TECHNICAL FIELD

The present disclosure relates to an ultralight aircraft for great altitudes.

BACKGROUND

For many applications, it is desirable to have available an aircraft which can remain in the air for a long time and can fly at great altitudes. Furthermore, for particular purposes, there is a need for an aircraft which, in the event of a structural collapse of the aircraft and an associated fall, can be brought to the ground safely with as little damage as possible.

For example, use is made of aircraft for air monitoring and air reconnaissance which fly at very great heights and have very long flight times and in the process are intended for example to be able to take aerial photographs. In an alternative application, an ultralight aircraft can also be referred to as a high altitude platform. A high altitude platform can be used for monitoring purposes (traffic, event, weather) or, at an appropriate height, even for mobile communications without the delay known in the case of satellites.

Developed for such uses are, inter alia, aircraft which have very long flight times and can operate at great altitudes. Solar cells, which are attached to the airfoils, are usually used for the energy supply. Such aircraft are usually operated in an unmanned state and can have a corresponding size. These aircraft are sometimes referred to as drones. Such aircraft are usually delicate or have a lightweight structure and can be damaged in the event of strong air turbulence, which, in an extreme case, can result in the flying qualities being lost, such that the aircraft falls or individual components can come away from the aircraft and can drop down.

SUMMARY

On this basis, it is an object of the disclosure herein to provide an aircraft which both has good flying qualities at great height and does not represent a hazard for the environment.

This object is achieved by an aircraft having the features disclosed herein, which include exemplary embodiments presented.

An aircraft which has a supporting structure, a wing structure and at least one drive apparatus is proposed. The supporting structure has at least one fuselage. The drive apparatus has at least one propeller and a drive motor. The aircraft has at least one energy store for providing energy for operation of the drive apparatus. The at least one drive apparatus and the at least one energy store are mechanically connected to the supporting structure and/or the wing structure of the aircraft by a securing device.

The disclosure herein is based on the concept of connecting the individual components of the aircraft mechanically together by way of an additional securing device in addition to the actual fastening of the components. The individual components of the aircraft, such as supporting structure, wing structure, drive apparatus and energy store are connected together by way of the additional securing device. The drive apparatus and the energy store usually have a high weight compared with the rest of the structure of the aircraft. If these components come away from the rest of the aircraft, they can achieve a high rate of fall when dropping freely from very great height and can cause not inconsiderable damage when striking the ground. In order, if the actual mechanical fastening of these components to the aircraft, i.e. to the actual supporting structure and/or the wing structure of the aircraft, loosens, to prevent detachment from the rest of the structure of the aircraft, most components of the aircraft are connected together by way of an additional mechanical securing device.

The airfoil or airfoils of the wing structure are in this case preferably dimensioned such that they can ensure sufficient lift for the aircraft alone at cruising speeds to be achieved by the aircraft. In particular, steering gear or a rudder can be arranged on the airfoil. The proposed aircraft is intended to have a supporting structure and a wing structure. The supporting structure is intended to ensure structural strength of the aircraft here, such that both the wing structure and the drive apparatus and energy stores can be fastened stably to the aircraft. The wing structure is intended to be able to ensure dynamic lift with the aid of suitably configured airfoils.

It is noted that although two separate terms are used for the supporting structure and the wing structure, this does not mean that the functions to be effected by the supporting structure and the wing structure necessarily have to be effected by separate actual structures. For example, functions of the supporting structure and functions of the wing structure can be effected by different structural components of the proposed aircraft or else by identical structural components of the aircraft. By way of example, a wing of an aircraft can simultaneously act as an airfoil that effects dynamic lift and thus as part of a wing structure, and also connect other components of the aircraft mechanically together and thus act as part of a supporting structure. For example, the wing can have an external skin which defines a profile of an airfoil formed thereby and is thus part of the wing structure. At the same time, the wing can have internal components, for example spars, which ensure mechanical strength and to which for example the wing skin is fastened, such that they can serve as a supporting structure.

The individual components of the proposed aircraft can in this case be configured and controlled in a comparatively simple manner.

According to one embodiment, the at least one drive apparatus, the at least one energy store, the supporting structure and/or the wing structure of the aircraft are connected together by the securing device. In order to avoid detachment of the relatively heavy components of the aircraft, for example the drive apparatus and the energy store, from the supporting structure and/or the wing structure, the drive apparatus and the energy store are connected mechanically together and to the supporting structure and/or the wing structure via the securing device. The mechanical protective device holds the components of the aircraft together. In particular, the individual components of the aircraft are held together by the additional securing device even when the actual fastening of the components to the aircraft itself has loosened or is damaged.

According to one embodiment, the drive apparatus is enclosed at least partially by a securing shroud. The securing shroud or protective shroud at least partially enclosing the drive apparatus ensures that the components of which the drive apparatus consists can be held together in the event of damage. Furthermore, the securing shroud at least partially forms mechanical protection for the drive apparatus.

According to one embodiment, the energy store is enclosed at least partially by a securing shroud or protective shroud. The securing shroud at least partially enclosing the energy store ensures that the components of which the energy store consists can be held together in the event of damage. Furthermore, the securing shroud at least partially forms mechanical protection for the energy store.

According to one embodiment, the securing shroud is mechanically connected to the securing device. In order to ensure a secure mechanical connection of the individual components, in particular the drive apparatus and the energy store, the respective securing shroud is mechanically connected to the securing device. The securing shroud or protective shroud surrounds the drive apparatus and the energy store, the protective device being mechanically connected to the securing shroud.

According to one embodiment, the securing shroud is a net or woven fabric. The net or the woven fabric encloses the drive apparatus and/or the energy store and thus provides protection against separation of components of the drive apparatus and/or of the energy store in the event of damage.

According to one embodiment, the securing shroud comprises or consists of a highly tear-resistant fiber or fiber composite. Preferably, the fiber comprises or consists of an ultralight, but highly tear-resistant fiber or fiber composite. As a result, the securing shroud or protective shroud provides protection, it being possible at the same time to keep the weight of the securing shroud low. Preferably, the fiber or the fiber composite comprises or consists of a material which is in particular UV resistant. Preferably, the material is also insensitive to extremely cold temperatures of about −90° C., as occur for example at great heights at which HAPS for example fly. By way of example, the securing shroud comprises or consists of a polyamide, for example nylon or a fiber or a fiber composite having comparable properties.

According to one embodiment, the securing device has at least one rope, strap and/or cable. The securing device can be for example a rope which connects the drive apparatus and the energy store together and to the supporting structure and/or the wing structure of the aircraft. For example, the rope, the strap or the cable is mechanically connected to the drive apparatus and the energy store, respectively. For example the rope is fastened to the drive apparatus and the energy store by an eyelet or the like. Alternatively, the rope is wrapped or wound around the drive apparatus and the energy store such that the drive apparatus and the energy store are connected firmly together and to the supporting structure and/or the wing structure by the rope.

According to one embodiment, the rope, the strap and/or the cable comprises or consists of a highly tear-resistant fiber or fiber composite. Preferably, the fiber comprises or consists of an ultralight, but highly tear-resistant fiber or fiber composite. As a result, the rope, strap and/or cable provide protection, it being possible at the same time to keep the weight of the rope, strap and/or cable as low as possible. Preferably, the fiber or the fiber composite comprises or consists of a material which is in particular UV resistant. Preferably, the material is also insensitive to extremely cold temperatures of about −90° C., as occur for example at great heights at which HAPS for example fly. By way of example, the rope, strap and/or cable comprises or consists of a polyamide, for example nylon or a fiber or a fiber composite having comparable properties.

According to one embodiment, the rope, strap and/or cable can be connected for example to the securing shroud or protective shroud, for example a net, such that the rope is woven together with the net, for example with the mesh of the net, or is woven into the mesh of the net, i.e. incorporated into the structure of the mesh of the net.

According to one embodiment, the securing device holds the components of the aircraft together in the event of a structural collapse of the aircraft. By way of the securing device, which connects the components of the aircraft together and to the supporting structure and/or the wing structure, the relatively heavy components, for example the drive apparatus and the energy store, are "bound" to the relatively light components of the aircraft, for example the supporting structure and/or the wing structure. The volume of the structurally collapsed aircraft is increased in particular by the relatively extensive wing structure and the supporting structure. As a result of the relatively large volume, the rate of fall is slowed in the event of a fall and the damage on striking the ground is minimized. In contrast, the relatively heavy components of the aircraft, such as the drive apparatus and the energy store, would reach a very high speed on falling freely on their own, on account of their relatively small volume in relation to dead weight, and can cause a correspondingly large amount of damage.

According to one embodiment, the aircraft is an unmanned ultralight aircraft. The aircraft is preferably a light aircraft or ultralight aircraft. Ultralight aircraft have a low weight with a relatively large wingspan. In order to achieve a relatively low overall weight of the aircraft, the individual components are largely unprotected and attached to the aircraft without a protective fairing. The structures of the aircraft are usually held together in a relatively delicate manner for weight reasons. In the event of a heavy storm or very turbulent weather, the aircraft can therefore be damaged, with the result that the structure, i.e. essentially the supporting structure and the wing structure, of the aircraft collapses or is heavily damaged. In this case, the flying qualities of the aircraft are lost or at least impaired to such a great extent that the aircraft falls, i.e. lands in an uncontrolled manner on the ground. In this case, it is advantageous, in particular in the case of relatively large flying structures, for as little damage to the environment as possible to occur. By way of the securing device, the above-described aircraft is capable of holding the structure of the aircraft together in the event of a fall and, by way of the volume of the aircraft per se, to cushion the fall of the aircraft at least to such an extent that the rate of fall is reduced and a "soft landing" is achieved. To be more precise, the relatively heavy components of the aircraft, i.e. the drive apparatus and the energy store, are "bound" to the actual aircraft, i.e. the supporting structure and the wing structure; in more simple terms, the components of the aircraft are held together.

According to one embodiment, the aircraft is a pseudo-satellite or what is known as a pseudolite. Pseudolite is a term put together from pseudo and satellite. A pseudo-satellite is a terrestrial or near-terrestrial transmitter which emits signals which imitate those of a satellite. In the present form, the aircraft serves as a near-terrestrial transmitter (compared with an actual satellite). Pseudolites are used for example to locally increase the measuring accuracy of satellite-based navigation systems, for example GPS. For a GPS receiver, pseudolites appear to be additional satellites. Pseudolites are also used to broadcast signals for satellite radio in cities. To be more precise, pseudolites assume, inter alia, tasks which are generally carried out by satellites, but have the advantage that costs for such a pseudolite are generally somewhat lower than for an actual satellite. In particular, high costs for a launching rocket, which is generally necessary to bring an "actual" satellite into orbit, are dispensed with. The present aircraft can for example be easily launched by hand, depending on the embodiment.

Alternatively, the aircraft can also be a high altitude platform. High altitude platform (station) (HAP(S)) is a generic term for quasi-stationary, unmanned flying objects at high altitude. A high altitude platform can be used for monitoring (traffic, event, weather) or, at an appropriate height, even for mobile communications without the delay known in the case of satellites.

BRIEF DESCRIPTION OF THE DRAWINGS

In the drawings, identical reference signs generally refer to the same parts throughout the various views. The drawings are not necessarily true to scale; rather, value is generally placed on illustrating the principles underlying the disclosure herein. In the following description, various embodiments of the disclosure herein are described with reference to the following drawings, in which.

DETAILED DESCRIPTION

The following detailed description refers to the appended drawings, which, for the purpose of explanation, show specific details and embodiments in which the disclosure herein can be practiced.

The expressions "for example" and "by way of example" are used herein with the meaning "serving as an example, case or illustration". Any embodiment or configuration that is described herein as "by way of example" is not necessarily intended to be preferred or advantageous with respect to other embodiments or configurations.

In the following detailed description, reference is made to the appended drawings, which form a part thereof and in which, for the purposes of illustration, specific embodiments in which the disclosure herein can be put into practice are shown. In this regard, directional terminology such as "top", "bottom", at the front", at the back", "front", "rear", etc. is used with regard to the orientation of the figure(s) described. Since components of embodiments can be positioned in a number of different orientations, the directional terminology serves for illustration and is in no way limiting. It goes without saying that other embodiments can be used and structural or logical modifications can be made without deviating from the scope of protection of the present disclosure. It goes without saying that the features of the various exemplary embodiments described herein can be combined with one another unless stated specifically to the contrary. The following detailed description should therefore not be understood in a limiting way, and the scope of protection of the present disclosure is defined by the appended claims.

In the scope of this description, the terms "connected", "attached" and "coupled" are used to describe both a direct and an indirect connection, a direct or indirect attachment and a direct or indirect coupling. In the figures, identical or similar elements are provided with identical reference signs, where appropriate.

Figure 1:
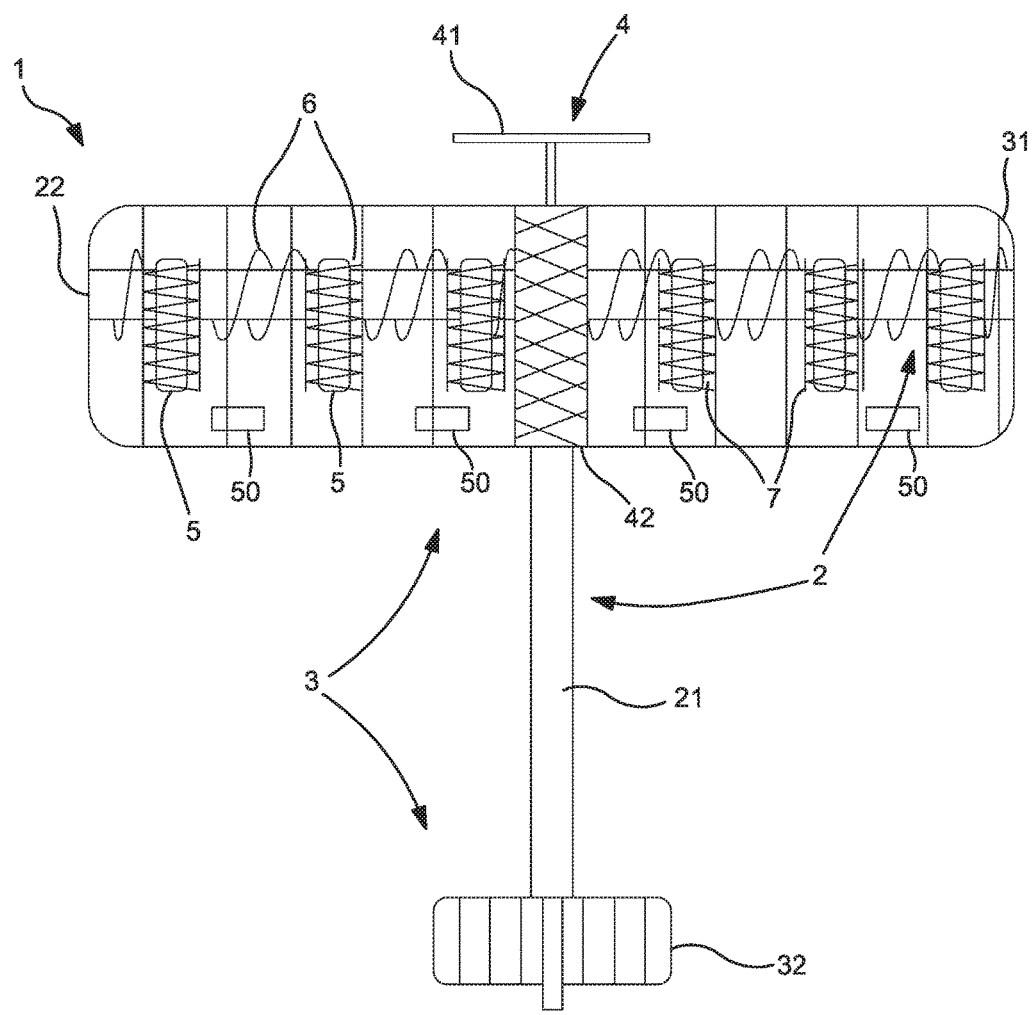
FIG. 1 shows a first embodiment of the aircraft.

FIG. 1 shows a first embodiment of the aircraft 1. The aircraft 1 is made up of a supporting structure, generally designated 2, which is provided with a wing structure, generally designated 3. In the illustrated embodiment of the aircraft 1, the supporting structure 2 comprises a fuselage 21 and an airfoil carrier 22. The wing structure 3 comprises an airfoil 31 and an elevator 32 in the illustrated embodiment. Arranged on the airfoil carrier 22 are a drive apparatus, generally designated 4, and a plurality of energy stores 5. The energy stores 5 comprise or consist for example of preferably rechargeable batteries. For weight reasons, the energy store 5 is divided into a plurality of batteries which are arranged in a manner distributed over the airfoil 31. Alternatively, the energy store 5 can also comprise or consist of an individual battery which, for weight reasons, is preferably arranged centrally, for example in the region of the fuselage 21.

In the illustrated embodiment, the drive apparatus 4 comprises a drive 42 with a motor and for example a transmission. The drive 42 drives a propeller 41 that serves to propel the aircraft 1. The drive 42 and the plurality of energy stores 5 are fastened to the airfoil carrier 22. Alternatively, the energy stores 5 can also be fastened directly to the airfoil 31 and the drive 42 can be fastened directly to the fuselage 21. In order to increase the range of the aircraft 1, solar cells 50 are preferably attached to the top side of the airfoil 31. Given solar radiation, the energy stores 5 are charged. The drive 42 preferably consists of an electric motor.

The drive 42 and the energy stores 5 are mechanically connected together and, in the illustrated embodiment, to the supporting structure 2, in this case the airfoil carrier 22, by a securing device 6. In the illustrated embodiment, the securing device 6 comprises a rope, or a strap, and securing shrouds 7 made of a meshlike net fabric. The rope or strap and the securing shrouds 7 preferably comprise or consist of a highly tear-resistant ultralight fiber or fiber composite. The energy stores 5 and the drive 42 are enclosed in the securing shrouds 7 in the illustrated embodiment of the aircraft 1. Preferably, the securing shrouds 7 surround the energy stores 5 and the drive 42 at least such that the latter are fastened in the securing shrouds 7 so as to be prevented from falling or slipping out of the securing shrouds 7. In the illustrated embodiment of the aircraft 1, the rope of the securing device 6 is wrapped around the airfoil carrier 22 of the supporting structure 2 of the aircraft 1 and is mechanically connected to the securing shrouds 7. The securing device 6 prevents the energy stores 5 and the drive 4 from coming away from the aircraft 1 per se and dropping down if the actual fastening of the energy stores 5 and of the drive 4 to the supporting structure 2 loosens or is damaged. Furthermore, the aircraft 1 can have further electronic and/or mechanical components, for example measuring instruments, sensors, cameras, communications apparatus etc. The further components can be attached for example to the fuselage 21 or to the airfoil carrier 22. The further components can likewise be secured to the supporting structure 2 and/or the wing structure 3 of the aircraft 1 by the securing device 6.

Figure 2:
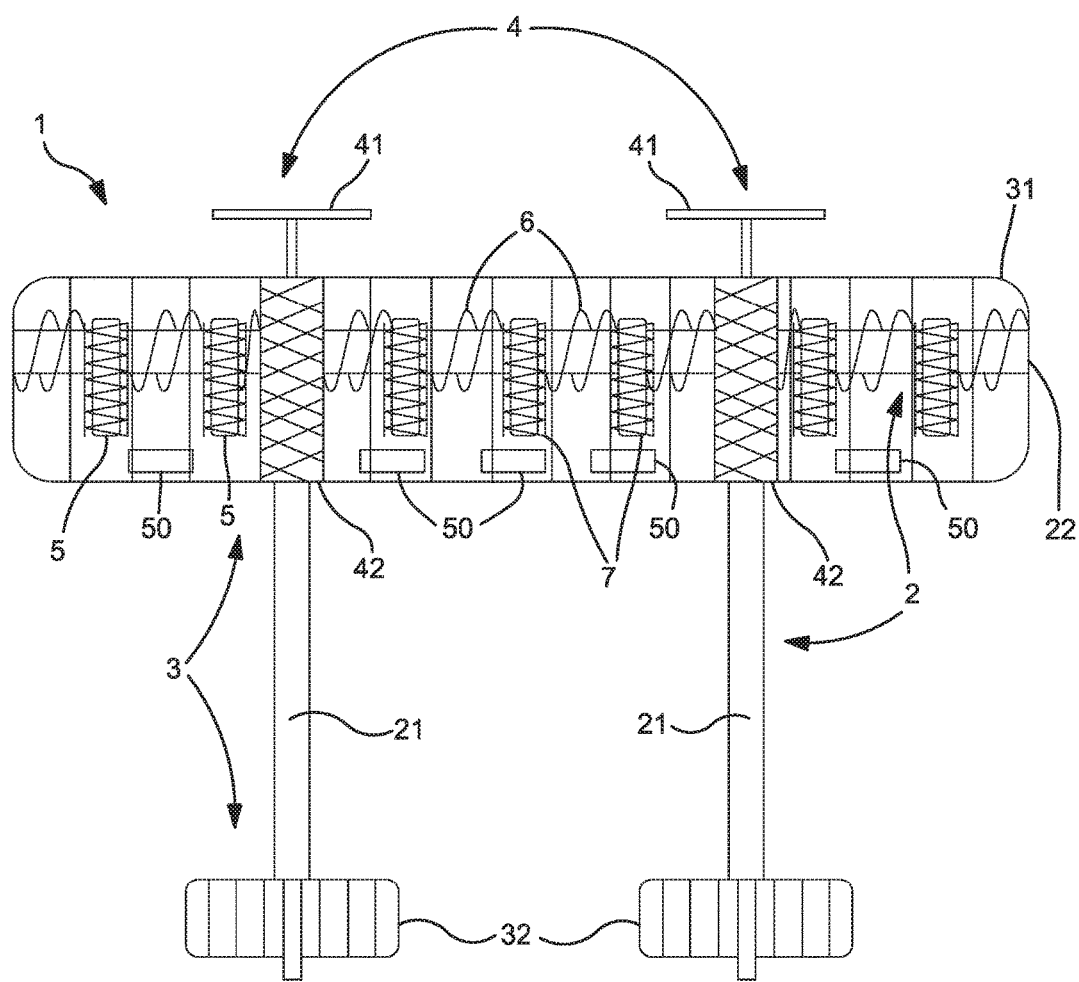
FIG. 2 shows a further embodiment of the aircraft.

FIG. 2 shows a further embodiment of the aircraft 1. Compared with the aircraft shown in FIG. 1, the aircraft 1 illustrated in FIG. 2 has what is known as a tandem structure with two fuselages 21 which are connected together by the airfoil carrier 22. The tandem structure has a common airfoil 31 and two elevators 32 in the illustrated embodiment. The two fuselages 21 each have a drive apparatus 4 which comprises in each case a motor 42 with a propeller 41. In order to drive the motors 42, the aircraft 1 has a plurality of energy stores 5. The energy stores 5 preferably comprise or consist of rechargeable batteries. In order to increase the range of the aircraft 1, the batteries are charged via solar cells 50. The solar cells 50 are arranged for example on the top side of the airfoil 31. Depending on the purpose of the aircraft 1, the latter can have further electronic and/or mechanical components, for example measuring instruments, sensors, cameras, communications apparatus etc.

Figure 3:
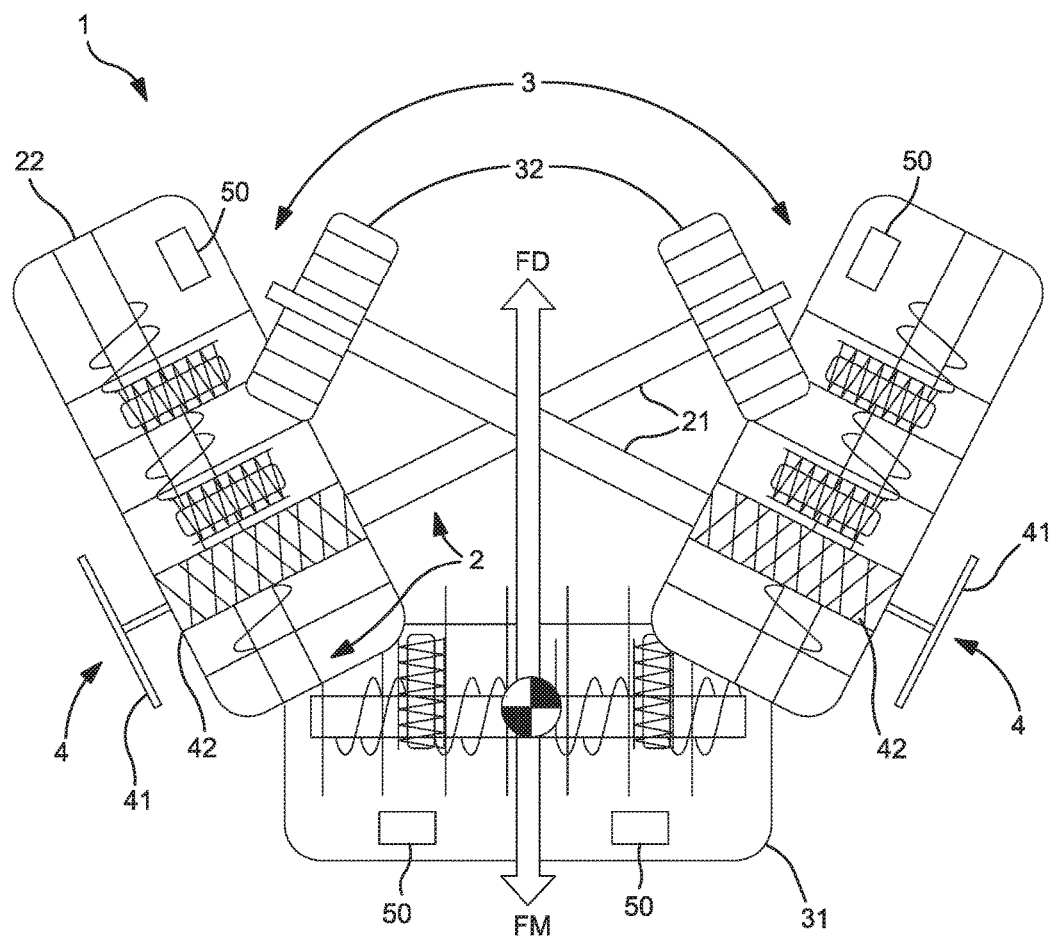
FIG. 3 shows a collapsed state of the aircraft in FIG. 2.

FIG. 3 shows a collapsed state of the aircraft 1 from FIG. 2. In the illustrated embodiment, the aircraft 1 has been damaged in the region between the two fuselages 21 such that three segments have been formed. The individual segments form the approximate shape of a shuttlecock in the illustrated case. The heavy components arranged largely in the direction of the central axis form a center of gravity FM. In the event of a fall, the center of gravity will therefore bring the collapsed aircraft 1 into the shape, illustrated here, of a shuttlecock, or at least into a comparable shape. The relatively large volume of the aircraft 1 compared with its relatively low weight has the effect that, as a result of the large volume of the aircraft 1, the air resistance FD is greatly increased and the aircraft 1 is strongly slowed during the fall in a similar manner to with a parachute or in the manner of a parachute.

Damage to or destruction of the actual fastening can occur for example if the aircraft 1 is itself damaged on account of a heavy storm. Especially in the case of an ultralight aircraft, on account of the lightweight and delicate construction, even a comparatively less heavy storm can damage the aircraft 1 such that its flying qualities are affected and the aircraft lands on the ground in an uncontrolled manner. In the case of the aircraft 1 described here, the securing device 6 prevents the relatively heavy components of the aircraft 1, such as the energy stores 5 and the drive 42, from coming away from the rest of the aircraft 1 and dropping down on their own. The energy stores 5 and the drive 42 have a comparatively high weight compared with their size and achieve a very high rate of fall when they fall freely from very high altitudes at which the described aircraft 1 generally flies, there consequently being a no less slight possibility of damage to the environment on impact. If the relatively heavy components, i.e. the energy stores 5 and the drive 42 remain together with the rest of the aircraft 1 while falling, the speed to be achieved while falling freely is substantially reduced by the relatively large volume of the aircraft 1 compared to the low overall weight as a whole of the aircraft 1.

Although the invention(s) herein has been shown and described primarily with reference to specific embodiments, it should be understood by those with knowledge in the technical field that numerous modifications with respect to the configuration and details of the embodiments can be implemented without departing from the essence and scope of the disclosure herein as defined by the appended claims. The scope of the disclosure herein is therefore determined by the appended claims, and it is therefore intended that all modifications which are covered by the literal meaning or the scope of equivalence of the claims are included.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Aircraft
2 Supporting structure
21 Fuselage
22 Airfoil carrier
3 Wing structure
31 Airfoil
32 Elevator
4 Drive apparatus
41 Drive
42 Propeller
5 Energy store
6 Securing device
7 Securing shroud

The invention claimed is:

1. An aircraft comprising:
 a supporting structure comprising at least one fuselage and an airfoil carrier;
 a wing structure attached to the airfoil carrier;
 at least one drive apparatus comprising at least one propeller and a drive motor;
 at least one energy store for providing energy for operation of the drive apparatus; and
 a securing device configured to mechanically connect the at least one drive apparatus and the at least one energy store to the airfoil carrier of the supporting structure,
 wherein the securing device comprises at least one of a rope, a strap, a cable, a net, and a woven fabric.

2. The aircraft of claim 1, wherein two or more of the at least one drive apparatus, the at least one energy store, the supporting structure, and the wing structure are connected together by the securing device.

3. The aircraft of claim 1, wherein the securing device comprises the net or the woven fabric, which are configured as a securing shroud, which is configured to enclose, at least partially, the at least one drive apparatus.

4. The aircraft of claim 3, wherein the securing shroud is mechanically connected to the securing device.

5. The aircraft of claim 3, wherein the securing device is also configured to mechanically connect the at least one drive apparatus and the at least one energy store to the wing structure.

6. The aircraft of claim 3, wherein the securing shroud comprises a fiber or a fiber composite, which are tear-resistant.

7. The aircraft of claim 1, wherein the securing device comprises the net or the woven fabric, which are configured as a securing shroud, which is configured to enclose, at least partially, the at least one energy store.

8. The aircraft of claim 1, wherein at least one of the rope, the strap, and the cable comprise a fiber or a fiber composite, which are highly tear-resistant.

9. The aircraft of claim 1, wherein the securing device is configured to hold components of the aircraft together in an event of a structural collapse of the aircraft.

10. The aircraft of claim 1, wherein the aircraft is an unmanned ultralight aircraft.

11. The aircraft of claim 1, wherein the aircraft is a pseudo-satellite.

12. The aircraft of claim 3, wherein the securing shroud comprises a polyamide.

13. The aircraft of claim 12, wherein the polyamide comprises nylon.

14. The aircraft of claim 6, wherein the fiber or the fiber composite comprises an ultraviolet (UV) resistant material.

15. The aircraft of claim 1, wherein the wing structure comprises an airfoil and an elevator.

16. The aircraft of claim 15, wherein the at least one energy store comprises a plurality of energy stores that are distributed over the airfoil carrier.

17. The aircraft of claim 15, comprising one or more solar cells for charging the at least one energy store, wherein the one or more solar cells are attached to the airfoil.

18. An aircraft comprising:
a supporting structure comprising at least two fuselages and an airfoil carrier, wherein each of the at least two fuselages are connected together by the airfoil carrier;
a wing structure comprising a common airfoil, wherein the wing structure is attached to the airfoil carrier;
a drive apparatus for each of the at least two fuselages, wherein each drive apparatus comprises at least one propeller and at least one drive motor;
a plurality of energy stores for providing energy for operation of the drive apparatus of each of the at least two fuselages;
a securing device configured to mechanically connect the drive apparatus of each of the at least two fuselages and the plurality of energy stores to the airfoil carrier of the supporting structure; and
solar cells for charging the plurality of energy stores;
wherein the securing device comprises at least one of a rope, a strap, a cable, a net, and a woven fabric.

19. The aircraft of claim 18, wherein:
the wing structure comprises a first elevator, which is attached to a first of the at least two fuselages, and a second elevator, which is attached to a second of the at least two fuselages;
the plurality of energy stores comprise rechargeable batteries; and
the solar cells are arranged on the common airfoil.

* * * * *